United States Patent

Fujisawa

[11] Patent Number: 5,849,054
[45] Date of Patent: Dec. 15, 1998

[54] FILTER FOR AN INFLATOR

[75] Inventor: Katsuhide Fujisawa, Yamato, Japan

[73] Assignee: Nippon Reinz Co., Ltd., Kanagawa, Japan

[21] Appl. No.: 551,170

[22] Filed: Oct. 31, 1995

[51] Int. Cl.⁶ .................................................. B01D 46/00
[52] U.S. Cl. ............................ 55/486; 55/525; 55/526; 55/DIG. 43; 280/740; 422/167
[58] Field of Search ............................ 95/273, 286, 287; 55/486, 487, 488, 489, 385.3, 525, 526, DIG. 43; 280/728.1, 734, 736, 737, 738, 740, 741, 742; 422/164, 167, 305

[56] References Cited

U.S. PATENT DOCUMENTS

| | | | |
|---|---|---|---|
| 1,639,132 | 8/1927 | Greene | 55/487 |
| 2,334,263 | 11/1943 | Hartwell | 55/525 |
| 3,690,606 | 9/1972 | Pall | 55/526 |
| 3,904,221 | 9/1975 | Shiki et al. | 280/736 |
| 4,012,211 | 3/1977 | Goetz | 55/487 |
| 4,131,299 | 12/1978 | Ono et al. | 280/736 |
| 4,137,847 | 2/1979 | Osborne | 280/741 |
| 4,322,385 | 3/1982 | Goetz | 55/487 |
| 5,064,459 | 11/1991 | Unterforsthuber et al. | 55/526 |
| 5,087,070 | 2/1992 | O'Loughlin et al. | 280/740 |
| 5,217,515 | 6/1993 | Guglielmi | 55/526 |
| 5,308,370 | 5/1994 | Kraft et al. | 55/525 |
| 5,378,015 | 1/1995 | Rink et al. | 280/736 |
| 5,480,185 | 1/1996 | Lowe et al. | 280/740 |
| 5,503,806 | 4/1996 | Fulmer et al. | 422/164 |

FOREIGN PATENT DOCUMENTS

| | | | |
|---|---|---|---|
| 370734 | 5/1990 | European Pat. Off. | 280/736 |
| 3742383 | 6/1989 | Germany | 280/736 |
| 1-293112 | 11/1989 | Japan | 280/736 |
| 4-66348 | 3/1992 | Japan | 280/736 |
| 6-55991 | 3/1994 | Japan | 280/736 |
| 7-285412 | 10/1995 | Japan . | |

OTHER PUBLICATIONS

Perry et al. (ed.), Chemical Engineer's Handbook 5th ed., NY:McGraw–Hill Book Co., 1973, pp. 23–39, 1973.

*Primary Examiner*—Duane S. Smith
*Attorney, Agent, or Firm*—Koda & Androlia

[57] ABSTRACT

The filter for an inflator of the present invention includes a cylindrical compressed mesh unit, which is multi-folded in its substantially entire length, and the multi-folded mesh unit is provided by folding a cylindrical wire mesh knitted from a single metal wire by a predetermined length from its one or both end portions in the longitudinal direction, so as to be overlaid on the outer peripheral surface of the cylindrical wire mesh, and such a folded overlaying is repeated a plurality of times. Then, the cylindrical mesh unit thus constituted is compressed in its longitudinal direction. The above-mentioned compressed cylindrical mesh unit should have a cavity ratio of 70 to 80% in terms of cavity ratio C defined by the equation indicated below:

$$C = (\rho o - \rho)/\rho o \times 100 (\%).$$

The inflator filter of the present invention may be the cylindrical compressed mesh unit solely or may be equipped with an outer protection cylinder on the outer periphery thereof, or may be further equipped with an inner protection cylinder on the inner periphery thereof.

7 Claims, 5 Drawing Sheets

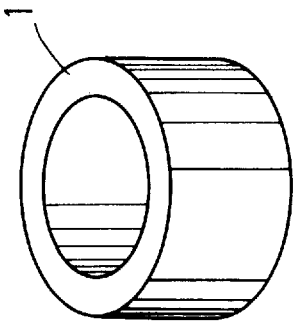
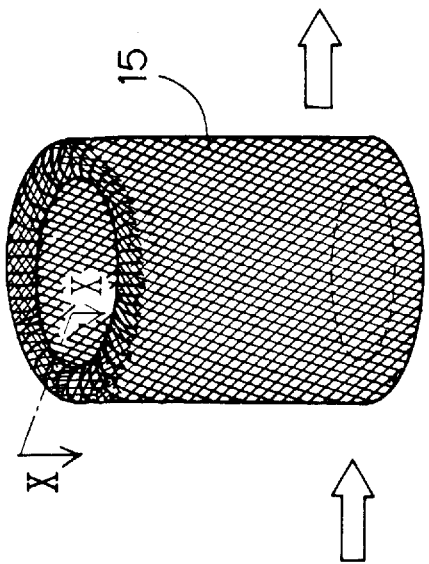
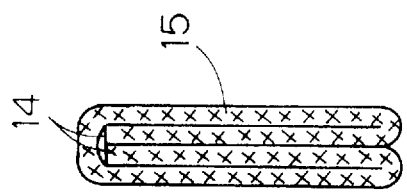
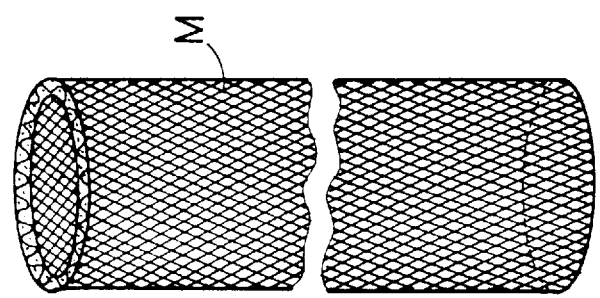

_(5,849,054)_

FILTER FOR AN INFLATOR

BACKGROUND OF THE INVENTION

1. Field of the Invention

The present invention relates to a filter for a gas inflator suitable to be built in an airbag system for relieving the impacts received by a driver at the time of an automobile collision to ensure the safety of the driver and a method of producing the same.

2. Prior Art

An airbag system, wherein a propellant (gunpowder) in an inflator is ignited to explosively generate gas at the time of an automobile collision, the gas is blown into an airbag to inflate it, and the cushion effect of the airbag relieves the impacts received by a driver to ensure the safety of the driver, has already been put to practical use and is achieving widespread use.

The gas explosively generated from the propellant in the gas generating chamber of the inflator contacts a cooling mesh, passes through a cylindrical filter from the inside to the outside thereof, passes through a plurality of gas-passing holes provided outside the filter along its cylindrical wall, and is blown from the inflator into the airbag to inflate it. The above-mentioned filter is used to catch high-temperature fine particles, such as dust particles generated by the explosion of the propellant, included in the gas so as to prevent such fine particles from flowing into the airbag. Since the filter is required to have high heat resistance, a conventional embodiment of the filter is made as follows: a plain-woven mesh made of metal wires (usually stainless steel wires) is cut to strips having a suitable size and the strips are wound in multiple into a cylindrical shape.

Since the above-mentioned conventional filter is made by overlaying a plurality of plain-woven meshes comprising straight vertical and horizontal element wires crossing one another at right angles, the mesh gap structure of the filter is simple, and the filtering effect of the filter is insufficient for catching fine particles, such as dust particles generated by the explosion of the propellant. To enhance the filtering effect of the conventional filter, finer meshes made of thinner metal wires must be overlaid one upon another in a more multiple shape. This increases the cost of the filter and causes the problem of increasing pressure loss during gas passing.

In addition, since the conventional filter is low in shape-retaining strength, when the filter receives gas pressure, the filter expands and parts of the filter enter gas-passing holes provided outside the filter along its cylindrical wall, thereby causing the problem of easily breaking the filter. When the filtering effect is insufficient or when the filter is broken, the high-temperature dust particles generated by the explosion of the propellant may leak into the airbag, thereby causing the danger that the airbag is damaged and that the function thereof is disabled or that the driver may suffer burns. Furthermore, since the conventional filter has a low shape-retaining strength and is apt to deform easily, it cannot be handled conveniently. Moreover, since the cut-off portions of the meshes are exposed at the upper and lower end surfaces of the cylindrical filter, there is a danger that other objects (tools, parts, other filters, etc.) may be caught by the loose wires of the cut-off portions, or the hands and fingers of workers being engaged in the production of airbags and inflators may be injured easily by the loose wires.

SUMMARY OF THE INVENTION

The present invention is intended to solve all the above-mentioned problems encountered in the conventional inflator filter. The object of the present invention is to provide an inflator filter having an improved filtering effect of catching high-temperature fine particles, such as dust particles generated by the explosion of a propellant. Another object of the present invention is to provide an inflator filter having a high shape-retaining strength, free from the danger that parts of the filter enter the gas passing holes of the inflator when subjected to gas pressure, and capable of being handled easily. Still another object of the present invention is to provide an inflator filter free from the danger that the exposed cut-off end portions of the meshes cause the danger of injuring the hands and fingers of an involved worker.

To achieve the above-mentioned objects, the inflator filter of the present invention comprises a cylindrical compressed mesh unit arranged such that one or both longitudinal end portions of a cylindrical wire mesh knitted from a metal wire are multi-folded back and overlaid onto the unbent outer cylindrical peripheral surface of the knitted wire mesh to form a cylindrical multi-folded overlaid mesh along almost the entire length of the knitted wire mesh thus processed (hereinafter simply referred to as a "multi-folded overlaid mesh") and that the cylindrical multi-folded overlaid mesh thus obtained is further compressed in its longitudinal direction.

In addition, the method of producing the inflator filter of the present invention comprises a step of knitting a metal wire into a cylindrical knitted wire mesh, a step of cutting the knitted wire mesh to a predetermined length, a step of folding back one or both longitudinal end portions of the cylindrical knitted wire mesh and overlaying the end portions bent onto the unbent outer cylindrical peripheral surface of the mesh, a step of repeating the folding back and overlaying operations a plurality of times to form a cylindrical multi-folded overlaid mesh, and a step of compressing the multi-folded overlaid mesh in its longitudinal direction to form a filter comprising a cylindrical compressed mesh unit.

In the inflator filter of the present invention having the above-mentioned structure, when the gas explosively generated by the ignition of the propellant placed in the gas generating chamber of the inflator passes through from the inside to the outside of the cylindrical compressed mesh unit, fine particles, such as dust particles generated by the explosion of the propellant and included in the gas are caught by the filter comprising the compressed mesh unit. As shown in FIG. 4, in the knitted wire mesh, a metal wire 11 is bent in zigzag, and adjacent rows of the metal wire are crossed with each other in such a manner as to form loops P. The mesh structure is thus complicated. Moreover, in the present invention, the cylindrical longitudinal end portion(s) 13 of a knitted wire mesh is folded back and overlaid onto the outer cylindrical peripheral surface 12 of a mesh as shown in FIG. 5 to form a cylindrical multi-folded overlaid mesh, and such folding back and overlaying is repeated a plurality of times, usually 4 to 6 times (see FIG. 6(*b*'), and then the mesh is further compressed in its longitudinal direction to obtain a compressed mesh unit to be used as a filter. The mesh gap structure thus formed in the filter of the present invention is far more complicated and finer than that of the conventional filter comprising a cylindrical multi-wound plain-woven mesh unit. The filtering effect of the filter of the present invention can thus be enhanced significantly. Therefore, the filter of the present invention can sufficiently catch fine particles, such as dust particles generated by the explosion of the propellant, and prevents fine particles from leaking from the inflator. As a result, there is no danger that the airbag is damaged by high-temperature fine particles.

In addition, since the above-mentioned compressed mesh unit is made by multi-folding and compression, it has far higher shape-retaining strength than the conventional mesh unit. The filter of the present invention is thus convenient in handling, and even when the filter receives explosive gas pressure, the filter is free from the danger that parts of the filter enter the gas-passing holes of the inflator and that the filter is damaged. Furthermore, in the above-mentioned compressed mesh unit, the cut-off portions at both longitudinal ends of the cylindrical knitted wire mesh are repeatedly folded back a plurality of times and wrapped inside the mesh unit. Since the cut-off portions are not exposed outside, there is no danger that the hands and fingers of the operator are damaged by the cut-off portions of the mesh.

It is preferable that the above-mentioned compressed mesh unit should have a cavity ratio of 70 to 80% in terms of cavity ratio C defined by the equation indicated below. In this range of the cavity ratio, the compressed mesh unit can deliver a proper filtering effect and has a sufficient shape-retaining strength:

$$C = (\rho o - \rho)/\rho o \times 100 (\%)$$

wherein $\rho$ is the apparent specific gravity of the compressed mesh unit and $\rho o$ is the specific gravity of the metal constituting the compressed mesh unit.

In the filter of the present invention, a protection cylinder having a plurality of small through holes on its cylinder wall may be overlaid on the outer periphery or on the outer and inner peripheries of the filter comprising the above-mentioned compressed mesh unit. In this case, since the compressed mesh unit is reinforced by the protection cylinder, the mesh unit can have higher strength and can be handled more easily.

BRIEF DESCRIPTION OF THE DRAWINGS

FIGS. 6a, 6b, 6b', and 6c are views showing a method of producing the inflator filter of the present invention.

DETAILED DESCRIPTION OF THE PREFERRED EMBODIMENT

Figure 1:
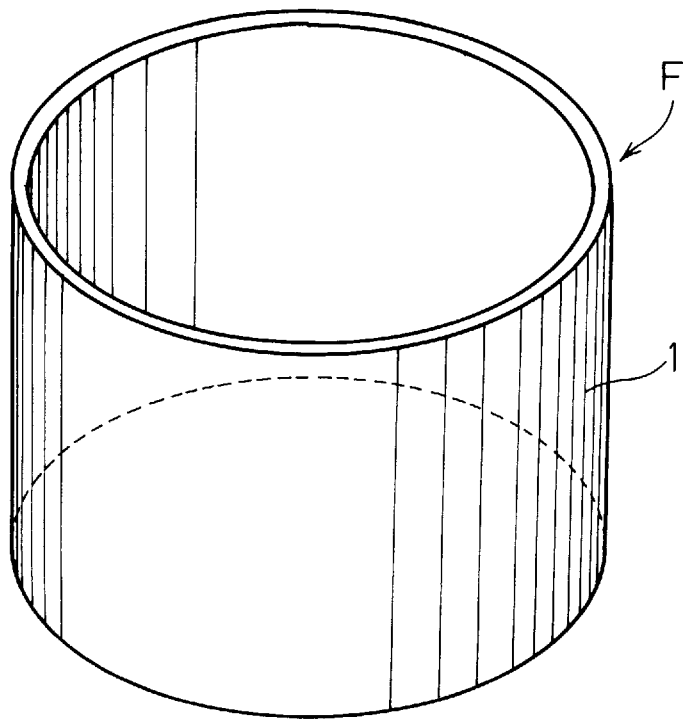
FIG. 1 is a perspective view showing an inflator filter of a first embodiment of the present invention.
Figure 2:
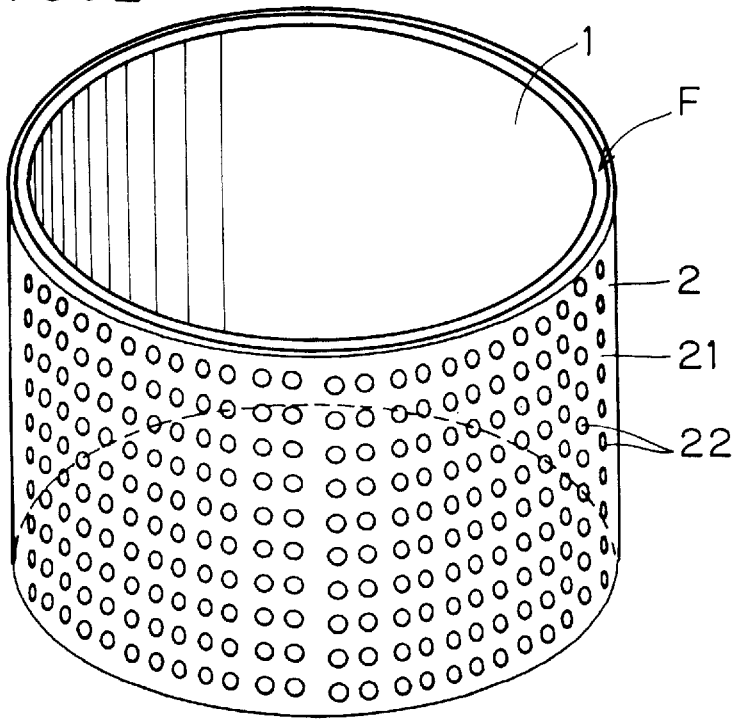
FIG. 2 is a perspective view showing a filter of a second embodiment of the present invention.
Figure 3:
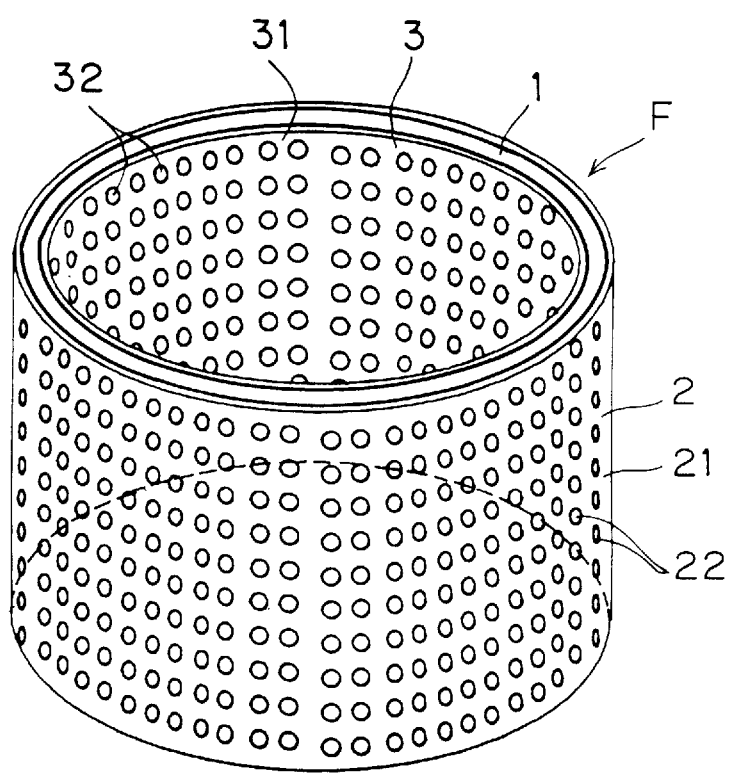
FIG. 3 is a perspective view showing a filter of a third embodiment of the present invention.
Figure 4:
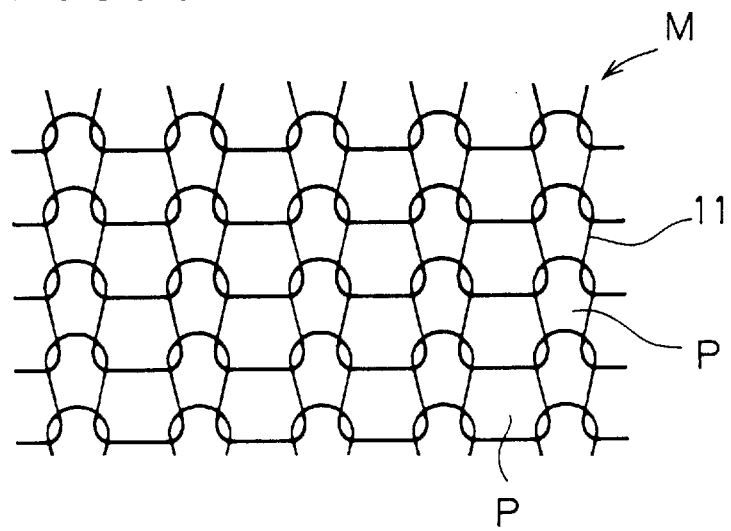
FIG. 4 is a view illustrating a knitted wire mesh.
Figure 5:
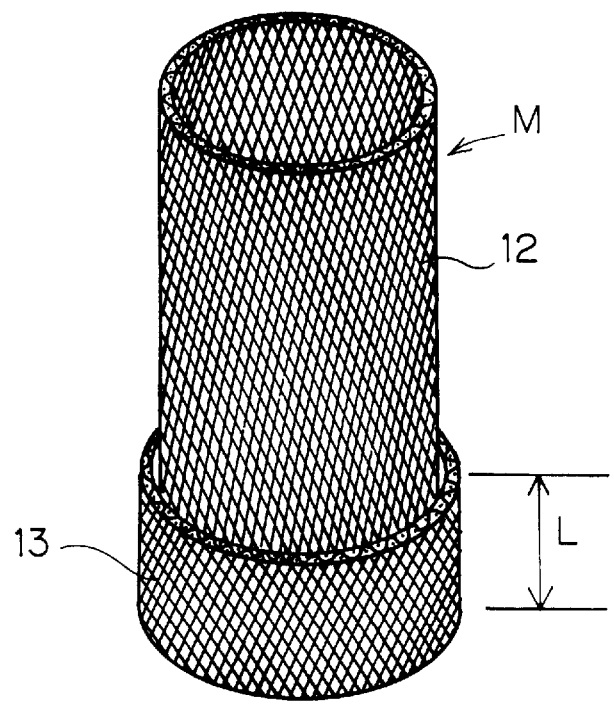
FIG. 5 is a view illustrating a cylindrical knitted wire mesh, one end portion of which is folded back onto its outer cylindrical periphery.
Figure 7:
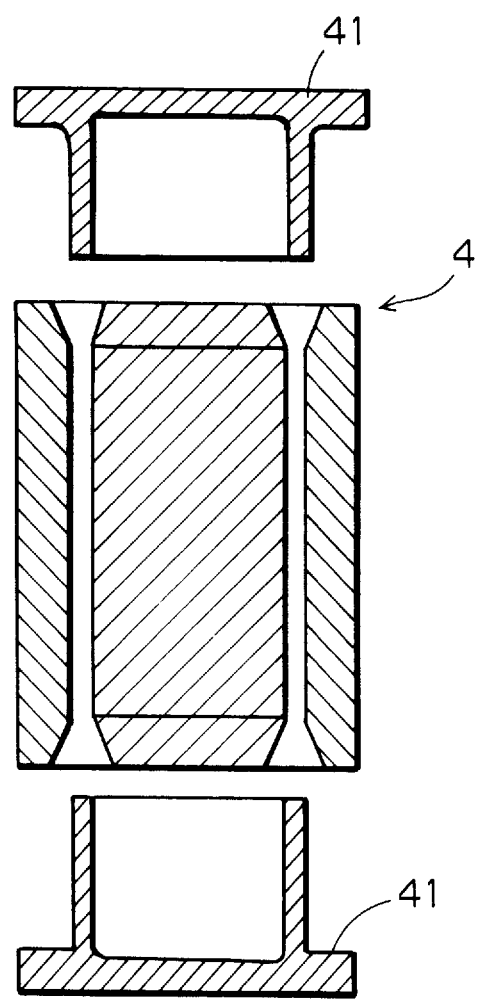
FIG. 7 is a sectional view showing a mold for compressing a multi-folded overlaid mesh in its longitudinal direction.

Referring to FIGS. 1 to 3, a filter F comprises a cylindrical compressed mesh unit 1, and the compressed mesh unit 1 is structured and produced as described below. More particularly, a metal wire 11, such as a stainless steel wire or a galvanized steel wire having a diameter of 0.08 to 0.3 mm, more preferably 0.15 to (1.25 mm, is knitted so that 7 to 9 loops P shown in FIG. 4 can be arranged per inch in the vertical and horizontal directions to form a cylindrical knitted wire mesh M having an inner diameter of 90 mm for example. This cylindrical knitted wire mesh M is cut to a predetermined length (usually 240 to 280 mm), 260 mm for example [FIG. 6(a)]. The end portion(s) 13 is folded back and overlaid onto the unbent outer cylindrical peripheral surface 12 of the mesh M, with a folding-back and overlaying length L shown in FIG. 5 being set at 65 mm for example, and such folding-back and overlaying operations are repeated three times for example to obtain a fourfold mesh (usually fourfold to sixfold) along almost the entire length of the knitted wire mesh thus processed, thereby forming a cylindrical multi-folded overlaid mesh 15 [FIG. 6(b)]. At the time of multi-folding and overlaying of the cylindrical knitted wire mesh M, it is preferable that both the upper and the lower ends should be folded and overlaid so that the cut-off surfaces 14 at both end portions of the cylindrical knitted wire mesh M are wrapped inside the multi-folded overlaid mesh 15 as shown in FIG. 6(b'), a sectional view taken on line X—X of FIG. 6(b), thereby avoiding any fear of injuring the fingers of an involved worker. Next, the cylindrical multi-folded overlaid mesh 15 is put into a mold 4 shown in FIG. 7, and the mesh 15 is compressed by compressing cylinders 41, 41 from the top and bottom of the mold 4 to form a cylinder of 90 mm in inner diameter, 2.5 mm in thickness and 20 mm in length, thereby obtaining a compressed mesh unit 1 [FIG. 6(c) and FIG. 1].

When the metal wire constituting this compressed mesh 1 is stainless steel wire or galvanized steel wire, the conditions of the above-mentioned compression are determined so that the apparent specific gravity $\rho$ of the obtained cylindrical compressed mesh 1 is preferably in the range of 1.6 to 2.4, more preferably, in the range of 2.0 to 2.2. The specific gravity of 1.6 to 2.4 corresponds to a cavity ratio of 70 to 80% when represented by the aforementioned cavity ratio C.

If the cavity ratio of the compressed mesh 1 is more than 80%, the filtering effect is weakened and the shape-retaining strength of the compressed mesh 1 is insufficient. If the cavity ratio is less than 70%, gas-passing resistance is high and gas cannot pass through the filter quickly.

In a first embodiment shown in FIG. 1, the above-mentioned cylindrical compressed mesh unit 1 solely constitutes the inflator filter of the present invention. In a second embodiment shown in FIG. 2, an outer protection cylinder 2 having a plurality of small through holes 22 provided on the cylinder wall 21 thereof is overlaid on the outer cylindrical periphery of the above-mentioned compressed mesh unit 1 to form the inflator filter of the present invention. The outer protection cylinder 2 is formed by winding a stainless steel plate having a thickness of 0.5 mm for example and a plurality of small through holes around the outer periphery of the compressed mesh unit 1 and by spot-welding the overlaid portion of the plate. The small through holes 22 are 1.0 mm in diameter for example and arranged at intervals of 2.0 mm for example. In addition, the small through holes may be in a staggered arrangement for example. An inner protection cylinder 3 having a plurality of small through holes 32 provided on the cylinder wall 31 thereof, is further overlaid on the inner periphery of the compressed mesh unit 1 of the inflator filter of the second embodiment to obtain a third embodiment shown in FIG. 3. The above-mentioned outer or inner protection cylinder is effective in increasing the shape-retaining strength of the filter of the present invention and in making the handling of the filter easier and more convenient as already described.

The above-mentioned inflator filter of the present invention can be changed and modified without departing from the spirit of the present invention.

I claim:

1. A filter for an inflator comprising:

a cylindrical compressed mesh unit arranged such that a cylindrical wire mesh knitted from a single metal wire is multi-folded so as to form a cylindrical mesh unit multi-folded in its substantially entire length, said multi-folded mesh unit being made by repeatedly folding a predetermined length of said cylindrical wire mesh from its one or both end portions in a longitudinal direction of said cylindrical wire mesh so as to be overlaid on the outer peripheral surface of said cylindrical wire mesh, and compressing said cylindrical mesh unit in said longitudinal direction, wherein said cylindrical compressed mesh unit has a cavity ratio of 70 to 80% in terms of cavity ratio C defined by the equation indicated below:

$$C = (\rho o - \rho)/\rho o \times 100 (\%)$$

wherein $\rho$ is the apparent specific gravity of said compressed cylindrical mesh unit and $\rho o$ is the specific gravity of the metal constituting said compressed mesh unit.

2. A filter for an inflator according to claim 1, wherein said compressed mesh unit further comprises an outer protection cylinder having a plurality of small through holes on the outer periphery thereof.

3. A filter for an inflator according to claim 2, wherein said compressed mesh unit further comprises an inner protection cylinder having a plurality of small through holes on the inner periphery thereof.

4. A cylindrical filter for an inflator to be used for passing gas from the inside to the outside of said cylindrical filter, said gas being generated by the explosion of a propellant placed in the gas generated chamber of said inflator, said cylindrical filter comprising a cylindrical compressed mesh unit arranged such that a cylindrical wire mesh knitted from a single metal wire is multi-folded so as to form a cylindrical mesh unit multi-folded in its substantially entire length, said multi-folded mesh unit being made by repeatedly folding a predetermined length of said cylindrical wire mesh from one or both end portions in a longitudinal direction of said cylindrical wire mesh so as to be overlaid on the outer peripheral surface of said cylindrical wire mesh, and compressing said folded cylindrical mesh unit in said longitudinal direction, wherein said cylindrical compressed mesh unit has a cavity ratio of 70 to 80% in terms of cavity ratio C defined by the equation indicated below:

$$C = (\rho o - \rho)/\rho o \times 100 (\%)$$

wherein $\rho$ is the apparent specific gravity of said compressed cylindrical mesh unit and $\rho o$ is the specific gravity of the metal constituting said compressed mesh unit.

5. A filter for an inflator according to claim 1 or 4, wherein the cut-off ends at both longitudinal end portions of said cylindrical knitted wire mesh are embedded inside said multi-folded overlaid mesh.

6. A filter for an inflator according to claim 1 or 4, wherein said metal wire is stainless steel wire having an outer diameter of 0.15 to 0.3 mm.

7. A filter for an inflator according to claim 1 or 4, wherein said metal wire is galvanized steel wire having an outer diameter of 0.15 to 0.3 mm.

* * * * *